Figure 1:
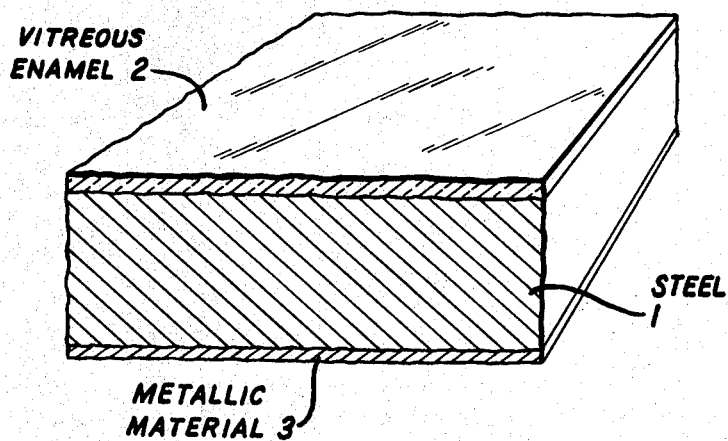

May 25, 1965 J. D. SULLIVAN 3,185,587
METHOD OF PREVENTING HYDROGEN PENETRATION INTO STEEL
Filed Nov. 14, 1960

INVENTOR.
James D. Sullivan
BY Andrus & Starke
Attorneys

United States Patent Office 3,185,587
Patented May 25, 1965

3,185,587
METHOD OF PREVENTING HYDROGEN
PENETRATION INTO STEEL
James D. Sullivan, Pewaukee, Wis., assignor to A. O. Smith Corporation, Milwaukee, Wis., a corporation of New York
Filed Nov. 14, 1960, Ser. No. 68,925
5 Claims. (Cl. 117—68)

This invention relates to a method of preventing penetration of hydrogen into metal articles when heating the articles at elevated temperatures, and more particularly to a method of preventing hydrogen penetration into steel during a vitreous enameling process.

When heating steel at elevated temperatures, water or moisture from the atmosphere reacts with the iron to form atomic hydrogen and iron oxide. The atomic hydrogen which is formed on the surface of the steel penetrates into the steel and is thought to partially remain as atomic hydrogen in the steel crystal lattice and to partially collect as molecular hydrogen in the voids or rifts therein. When the steel is cooled after heat treatment, the molecular hydrogen, being less soluble in the cool steel than in the hot steel, will tend to pass out of the steel. If the steel is covered with a glass or vitreous enamel coating, the hydrogen will collect beneath the coating and when the pressure builds up to a sufficient degree, small portions of the coating will pop off resulting in what is known as fishscaling of the glass coating. In other steel heat treating processes, hydrogen penetration is also undesirable, for it causes decarburation of the steel, embrittlement, and decreased fatigue strength.

The present invention is directed to a method of decreasing the hydrogen penetration into steel during heat treating of the steel and also serves to control oxide scale formation during the heat treatment. The method comprises the steps of covering the exposed surfaces of the steel with finely divided particles of a metallic material selected from the group consisting of manganese, nickel, cobalt, chromium, nickelous oxide (NiO), cobaltous oxide (CoO), cobaltic oxide (Co$_3$O$_4$), chromic oxide (Cr$_2$O$_3$), chromic acid anhydride (CrO$_3$) and manganese dioxide (MnO$_2$). It is believed that the coating of finely divided metallic material adsorbs a portion of the water or moisture from the atmosphere during the heating operation and thereby forms a barrier that reduces the amount of water available for reaction with the steel to produce atomic hydrogen. In addition, it is believed that the metallic material serves to catalyze oxidation reactions and therefore increases the rate of oxidation of the hydrogen formed at the steel surface to form water, thereby reducing the hydrogen penetration into the steel.

In a process of vitreous enameling, a coating of glass or vitreous enamel is applied directly to a surface of the steel and the opposite exposed surface of the steel is coated with finely divided particles of the metallic material which is applied to the steel surface in an amount of 0.25 to 6.0 grams of the dry metallic material per square foot of steel surface.

During firing of the glass coated steel article at a temperature in the neighborhood of about 1600° F., it is believed that the moisture in the furnace atmosphere is adsorbed on the surface of the fine metal oxide crystalline particles. This decreases the amount of hydrogen developed at the steel surface and thereby decreases the hydrogen penetration into the steel and diffusion through the steel. By decreasing hydrogen penetration and diffusion, the amount of fishscaling of the glass coating on the opposite side of the steel surface is substantially reduced. When using the metal particles, it is thought that firing the steel article in an oxidizing atmosphere will oxidize the metal to the corresponding listed oxides and thereby similarly reduce the fishscaling tendencies of the glass coating.

In a modified form of the invention, finely divided particles of barium phosphate are mixed with the metallic material and this mixture is applied as a coating to the steel surface. The addition of the barium phosphate further reduces penetration of moisture through the coating and correspondingly decreases hydrogen penetration, thereby enabling the steel to be heated in a furnace atmosphere having a dew point up to 90° F. Furthermore, as the barium phosphate is a glass former, the coating will be less porous, resulting in a reduction of the oxide scale formation on the steel surface during heating.

The present invention provides a simple and inexpensive process which reduces fishscaling of glass coated steel and other hydrogen defects in steel. As the application of the particles of the metallic material substantially reduces fishscaling, acid resisting cover coats having medium to high fishscaling tendencies can be successfully applied directly to the opposite steel surface.

Other objectives and advantages will appear in the course of the following description.

The drawings illustrate the best mode presently contemplated of carrying out the invention.

In the drawings:
FIGURE 1 is a perspective view of a steel plate having a layer of the metallic material applied to one surface and a glass coating applied to the opposite surface; and
FIG. 2 is a flow sheet showing the steps of the process of the invention.

FIGURE 1 illustrates a composite structure including a metal base 1 coated with a glass or vitreous enamel composition 2 having a layer of a metallic material 3 disposed on the opposite surface of the base 1.

The base metal to which the vitreous enamel is applied may take the form of any ferrous material, such as relatively low carbon steel, commonly referred to as enameling iron and having a carbon content of 0.01% to 0.03% or higher carbon steel having a carbon content up to 0.30%.

Figure 2:
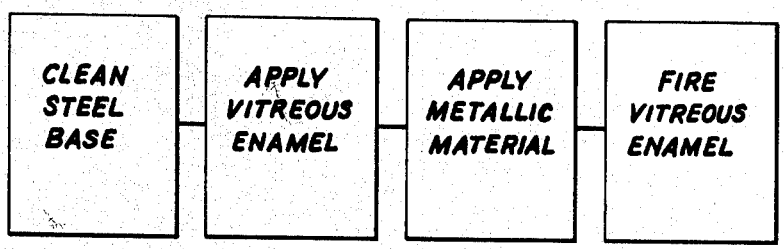

In carrying out the process of the invention, as shown in FIG. 2, the steel base 1 is initially cleaned by any conventional method, such as pickling, sandblasting, grit blasting or the like.

After cleaning the steel, the glass composition 2 and the metallic layer 3 are applied to the cleaned base 1. The order in which the coatings 2 and 3 are applied is not critical, and either may be applied first. However, if the steel base 1 is in the form of a tubular member, such as a hot water tank, it is most desirable to apply the glass coating to the inner surface initially because external rolls are employed to rotate the tank during the application of the glass and the rolls may injure the metallic coating 3 applied to the outer surface of the tank if the metallic coating were applied first.

The glass or vitreous enamel composition applied to the steel base 1 may be any of the conventional types of vitreous enamel or glass normally applied to steel base members.

The metallic material to be used is selected from the group consisting of nickel, cobalt, manganese, chromium, nickelous oxide (NiO), cobaltous oxide (CoO), cobaltic oxide (Co$_3$O$_4$), chromic oxide (Cr$_2$O$_3$), chromic acid anhydride (CrO$_3$), manganese dioxide (MnO$_2$) and mixtures thereof. It has been found that only the above listed metals and oxides, when applied to the steel surface as finely divided particles, will provide the desired results and other related metals and other valence forms of the oxides will not eliminate fishscaling to any appreciable extent.

The metallic material can be applied in any convenient way to the steel surface so as to obtain a concentration or thickness of the finely divided particles of the metallic material in the range of 0.25 to 6.0 grams of the dry metallic material per square foot of steel surface.

It has been found that an aqueous spray is a convenient method of applying the metallic material to the steel. In this regard, an aqueous suspension which can be satisfactorily sprayed onto the steel surface has the following compositional range in weight percent:

| | |
|---|---|
| Metallic material | 5–30 |
| Silica | 0–40 |
| Bentonite | 0–10 |
| Sodium carbonate | 0–1 |
| Sodium nitrite | 0–1 |
| Water | Balance |

The silica employed in the aqueous suspension is a diluting material or filler which helps distribute the metallic material and aids in the suspension. Bentonite is a conventional suspending agent which tends to maintain the metallic material in suspension in the water, and the sodium carbonate and sodium nitrite serve as corrosion inhibitors.

The mill additions, such as the fillers, suspending agents and corrosion inhibitors, do not, in any way, take part in any chemical reaction occurring during the firing nor, in any way, affect the characteristics or properties of the glass coating applied to the opposite surface of the steel. It is desirable, however, when using a filler or suspending agent to use one that has a minimum of chemically combined water which will dissociate at elevated temperatures to form atomic hydrogen in the glass-steel fusion reaction.

The metallic material should have a particle size finer than 200 mesh to prevent excessive local concentrations and to insure an adequate surface area of the metallic material. Generally, the particle size should be such that all of the particles will pass through a 200 mesh screen (U.S. Standard Sieve Series) and 90% will pass through a 325 mesh screen.

The aqueous or other evaporable liquid suspension of the metallic material can be applied to the steel base by spraying, dipping, slushing, brushing or the like, and the steel is then heated at a temperature generally in the range of 100 to 500° F. to drive off the liquid and leave the dried coating on the steel base.

In place of the aqueous suspension, in some cases it is possible to use a dry dusted coating of the finely divided metallic material on the steel and in this case, of course, no drying operation is employed. Similarly, the particles of the metallic material can be applied to the steel by grit or shot blasting the steel with grit or shot composed of the metallic material.

If the concentration of the metallic material is below 0.25 gram per square foot of steel surface, only a very slight decrease in hydrogen penetration is brought about. Moreover, if the concentration is above 6 grams per square foot of steel surface, the effectiveness of the metallic material in decreasing the hydrogen penetration is also reduced, for some unknown reason.

The metallic material is applied to the opposite surface of the steel from the glass coating in the form of discrete crystalline particles and this porous coating tends to adsorb water or moisture from the atmosphere on the surface of the fine particles and prevent reaction between the water and the steel at elevated temperatures. As the reaction between the water and the steel is prevented, the amount of atomic hydrogen developed is substantially reduced and thus, fishscaling is decreased.

The invention is particularly useful when firing the glass coating in a non-controlled atmosphere. In the summer months with a high humidity atmosphere, the dew point of gases in the furnace may be as high as 80 to 85° F. Under normal conditions, this high amount of moisture in the furnace atmosphere will react with the steel to generate substantial atomic hydrogen which will penetrate into the steel. Furthermore, in a direct fired furnace, the combustion gases will contact the steel and the hydrogen of the combustion gas will combine with oxygen in the air to form additional quantities of water which normally will react with a steel surface to form atomic hydrogen. Furthermore, even in a controlled atmosphere firing process in which the humidity is controlled, there are occasional leaks of oxygen into the furnace atmosphere which results in the formation of water which will tend to react with the steel surface.

By coating the opposite or exposed surface of the steel with the particles of the metallic material, the water or moisture in the furnace atmosphere is adsorbed and prevented from contacting the steel surface to thereby prevent the development of atomic hydrogen at the steel surface. This results in a glass coating which is substantially free of hydrogen defects, such as fishscaling, and enables acid resistant cover coats which are highly susceptible to fishscaling to be applied directly to steel.

It has been found that the coated steel article should be fired in an oxidizing atmosphere. If fired in a reducing atmosphere, an increased amount of moisture will penetrate through the coating of the metallic material, resulting in an increased amount of fishscaling in the glass coating on the opposite surface.

It has been found that the addition of finely divided particles of barium phosphate to the metallic material coating 3 will act to further decrease the hydrogen penetration into the metal article. The mixture of the metallic material and the barium phosphate is employed in an amount of 0.5 to 8.0 grams of the dry mixture per square foot of the steel surface and the barium phosphate comprises from 30% to 75% by weight of the mixture.

The barium phosphate to be employed may take the form of barium metaphosphate, $Ba(PO_3)_2$; tertiary orthophosphate, $Ba_3(PO_4)_2$; or secondary orthophosphate, $BaHPO_4$.

While the particle size of the barium phosphate is not as critical as the particle size of the metallic material, the phosphate should generally have a particle size smaller than 200 mesh, meaning that all particles will pass through a 200 mesh screen (U.S. Standard Sieve Series).

The phosphate is mixed with the particles of the metallic material and the mixture is applied to the steel surface in the form of a liquid suspension or a dry dust coat. An aqueous suspension is generally the most practical, and a typical aqueous suspension is as follows in weight percent:

| | |
|---|---|
| Metallic material | 5–30 |
| Barium phosphate | 1.5–21 |
| Bentonite | 0–10 |
| Sodium carbonate | 0–1 |
| Sodium nitrite | 0–1 |
| Water | Balance. |

The barium phosphate addition to the coating of the metallic material decreases the penetration of water vapor through the coating and thereby reduces the amount of hydrogen developed at the steel surface. This in turn will correspondingly decrease the fishscaling in the glass coating on the opposite surface of the steel base and decrease other hydrogen defects. This enables the steel article to be fired in furnace atmospheres having higher dew points, up to +90° F. In addition, the barium phosphate addition provides a more dense coating resulting in a decrease in oxide scale formation on the steel surface during firing.

While the present description is directed to a vitreous enameling process, it is contemplated that the invention can be used to reduce the hydrogen penetration for other heat treating processes for steel and other metals which are susceptible to hydrogen penetration. The use of the coating of fine crystalline metallic particles on the metal base will reduce the hydrogen penetration and thereby decrease the hydrogen defects, such as decarburation, which may occur in the metal base due to the hydrogen penetration.

Example No. 1

A 0.088 inch x 6 inch x 12 inch SAE 1020 steel plate was cleaned with an alkali wash and grit blasted with steel grit. An aqueous suspension having the following composition in parts by weight was then sprayed on one-half of one surface of the cleaned steel plate:

| | |
|---|---|
| NiO (−325 mesh) | 7.0 |
| $Ba(PO_3)_2$ | 3.0 |
| Bentonite | 0.9 |
| Sodium nitrite | 0.1 |
| Water | 75.0 |

The sprayed plate was then dried at a temperature of 400° F. and the coated half of the plate had a concentration of 1.6 grams of NiO per square foot of steel surface and a concentration of $Ba(PO_3)_2$ of .69 gram per square foot.

A commercial acid resistant cover coat vitreous enamel was then applied to the entire opposite surface of the steel plate. The plate was then fired at a temperature of 1580° F. for a period of 11 minutes. The furnace atmosphere had a dew point of 84° F. and was composed of air with some products of combustion. The half of the glass coated steel plate to which the NiO and $Ba(PO_3)_2$ coating was applied was free of fishscaling and other hydrogen defects, while the uncoated half showed evidence of substantial fishscaling.

Example No. 2

A 0.088 x 6 x 12 inch SAE 1020 steel plate was pickled in a 7% aqueous solution of sulphuric acid at 140° F. for 6 minutes. After pickling, the plate was rinsed in water and then dipped in an alkali solution containing sodium carbonate and borax to delay rusting.

An aqueous suspension having the following composition in parts by weight was then sprayed on one-half of one surface of the pickled steel plate:

| | |
|---|---|
| Cobaltic oxide (−325 mesh) | 7.0 |
| Silica | 3.0 |
| Bentonite | 0.9 |
| Sodium nitrite | 0.1 |
| Water | 75.0 |

The plate was then dried for 4 minutes at a temperature of 400° F. and the coated half of the dried plate had a concentration of 2.55 grams of cobaltic oxide per square foot of steel surface.

A commercial acid resistant cover coat glass was then applied to the entire opposite surface of the steel plate and fired in air at a temperature of 1580° F. for 11 minutes. The dew point of the furnace was 74° F.

The resulting plate showed that the glass coating on the half of the plate to which the cobaltic oxide coating was applied was free of fishscaling and other hydrogen defects, while the glass coating applied to the half of the plate not coated with cobaltic oxide showed substantial fishscaling, make it unsatisfactory for use.

Example No. 3

One-half of a surface of a steel plate, having a composition and cleaned in the manner of Example No. 1, was coated with an aqueous composition having the following composition in parts by weight:

| | |
|---|---|
| $MnO_2$ (−325 mesh) | 7.0 |
| $Ba_3(PO_4)_2$ | 3.0 |
| Bentonite | 0.9 |
| Sodium nitrite | 0.1 |
| Water | 75.0 |

The plate was then dried as in the manner of Example No. 1 with the coated half having a concentration of $MnO_2$ of 3.24 grams per square foot of steel surface and a concentration of $Ba_3(PO_4)_2$ of 1.39 grams per square foot. An acid resistant cover coat glass was applied to entire opposite surface of the plate and fired in air at a temperature of 1580° F. for 11 minutes. The dew point of the furnace was 75° F.

The resulting glass coated steel plate showed that the glass coating on the half of the plate coated with $MnO_2$ and $Ba_3(PO_4)_2$ was free of fishscaling and other hydrogen defects, while the portion of the glass coating to which the $MnO_2$ and $Ba_3(PO_4)_2$ coating was not applied, showed substantial evidence of fishscaling.

Example No. 4

A steel plate was prepared in the manner of Example No. 1 in which chromic oxide was substituted for the nickelous oxide in the aqueous suspension. The resulting dried plate had a concentration of 2.2 grams of dry chromic oxide per square foot of steel surface and a concentration of $Ba(PO_3)_2$ of 0.93 gram per square foot.

A glass similar to that set forth in Example No. 1 was applied to the opposite surface of the steel plate and fired in air at 1580° F. for 11 minutes. The dew point of the furnace was 71° F.

The resulting glass coated steel article showed that the glass coating on the portion of the plate coated with the chromic oxide and barium phosphate was free of fishscaling and other hydrogen defects, while the glass coating on the portion of the steel plate not coated with the chromic oxide and barium phosphate showed substantial evidence of fishscaling.

Example No. 5

One-half of a surface of a steel plate, having a composition and cleaned in the manner of Example No. 1, was coated with an aqueous slurry having the following composition in parts by weight:

| | |
|---|---|
| Chromium (−325 mesh) | 7.0 |
| Bentonite | 4.0 |
| $NaNO_2$ | 0.9 |
| Water | 75.0 |

The plate was dried and the coated half of the plate had a concentration of chromium particles of 1.16 grams per square foot of steel surface. An acid resistant glass cover coat was applied to the entire opposite surface of the plate and fired in air at 1600° F. for 9 minutes. The dew point of the furnace was 80° F.

The half of the fired plate to which the chromium particles had been applied was free of fishscaling and other hydrogen defects, while the uncoated half showed substantial fishscaling.

Example No. 6

A steel plate was prepared in the manner of Example No. 5 except that finely divided cobalt having a particle size of −325 wesh was substituted for the chromium. The dried coating had a concentration of cobalt particles of 1.3 grams of cobalt per square foot of steel surface. A chemical resistant glass was applied to the opposite surface of the plate and fired in air at 1600° F. for 9 minutes. The dew point of the furnace was 84° F.

The glass coating on the portion of the plate coated with cobalt was free of fishscaling and other hydrogen defects, while the glass coating on the portion of the plate not coated with cobalt particles showed evidence of fishscaling.

Various modes of carrying out the invention are contemplated as being within the scope of the following claims particularly pointing out and distinctly claiming the subject matter which is regarded as the invention.

I claim:

1. A method of applying a vitreous enamel coating to a steel article, comprising applying a vitreous enamel coating composition directly to one portion of the steel article, applying directly to a second and separate portion of the steel article a coating consisting essentially of finely divided particles of a metalling substance selected from the group consisting of nickel, cobalt, chromium, manganese, nickelous oxide, cobaltic oxide, cobaltous oxide, manganese dioxide, chromic oxide, chromic acid anhydride and mixtures thereof, maintaining said second portion free of said vitreous enamel coating composition, and heating the steel article in an oxidizing atmosphere containing a substantial portion of water vapor to a temperature sufficiently high to fuse the vitreous enamel and whereat substantial quantities of hydrogen are normally developed by reaction of water vapor with steel, said particles of the metallic substance serving to adsorb the water vapor and prevent the water vapor from reacting with the steel and thereby reduce the hydrogen defects in the vitreous enamel coating on said steel.

2. A method of applying a vitreous enamel coating to a steel article, comprising applying a vitreous enamel composition directly to one surface of the steel article, applying a coating to the opposite surface of the steel article in an amount of 0.5 to 8.0 grams of coating per square foot of steel surface, the dried coating comprising a mixture consisting essentially of 30 to 75% by weight of finely divided discrete particles of barium phosphate and the balance being finely divided discrete particles of a metallic substance selected from the group consisting of NiO, Co, Cr, Mn, Ni, CoO, $Co_3O_4$, $CrO_3$, $MnO_2$, and mixtures thereof, exposing the coating to an oxidizing atmosphere containing a substantial portion of water vapor, and heating the coated steel article to an elevated temperature sufficiently high to fuse the vitreous enamel to the steel while maintaining the coating exposed to said atmosphere, the particles of the coating serving to adsorb the water vapor and prevent the water from reacting with the steel to produce atomic hydrogen.

3. The method of claim 2 in which the barium phosphate is selected from the group consisting of $Ba(PO_3)_2$, $Ba_3(PO_4)_2$, $BaHPO_4$, and mixtures thereof.

4. A method of vitreous enameling a steel article, comprising applying a vitreous enamel composition directly to one surface of the steel article, applying directly to the opposite surface of the steel article a coating consisting essentially of finely divided particles of a metallic substance selected from the group consisting of nickel, cobalt, chromium, manganese, nickelous oxide, cobaltic oxide, cobaltous oxide, manganese dioxide, chromic oxide, chromic acid anhydride and mixtures thereof, said metallic substance having a particle size smaller than 200 mesh, exposing the coating of the metallic substance to an oxidizing atmosphere containing a substantial portion of water vapor, and heating the coated steel article to an elevated temperature above the softening temperature of the vitreous enamel while exposing the coating of the metallic substance to said oxidizing atmosphere to thereby fuse the vitreous enamel to the steel article with said particles of the metallic substance serving to adsorb the water vapor and prevent the water from reacting with steel to produce atomic hydrogen and thereby reduce the hydrogen defects in the vitreous enamel coating.

5. The method of claim 4 in which the coated metal article is heated in a furnace having a dew point in the range of $+10°$ F. to $+90°$ F.

References Cited by the Examiner

UNITED STATES PATENTS

| | | | |
|---|---|---|---|
| 1,213,330 | 1/17 | Betts | 106—253 |
| 1,962,617 | 6/34 | Rosenberg | 117—53 X |
| 2,403,706 | 7/46 | Bryant | 117—22 |
| 2,612,457 | 9/52 | Davis | 117—129 X |
| 2,716,271 | 8/55 | Higgens | 117—129 X |
| 2,940,865 | 6/60 | Sullivan | 117—129 X |
| 2,975,072 | 3/61 | Bryant et al. | 117—68 |
| 2,976,171 | 3/61 | Sullivan | 117—53 |
| 2,977,241 | 3/61 | Oliver et al. | 117—70 X |
| 2,980,553 | 4/61 | Sullivan | 117—129 X |

FOREIGN PATENTS

| | | |
|---|---|---|
| 605,337 | 7/48 | Great Britain. |
| 755,559 | 8/56 | Great Britain. |

OTHER REFERENCES

Zapffe et al.: The Relation of Defects in Enamel Coatings to Hydrogen in Steel, Journal of the American Ceramic Society, vol. 23, No. 7, 1940, pp. 187–215.

Higgens et al.: Investigation of Fish-Scale Phenomena, Journal of the American Ceramic Society, vol. 24, No. 12, 1941, pp. 383–392.

Deringer: Relation of Hydrogen to Adherence of Sheet-Steel Enamels, Journal of the American Ceramic Society, vol. 26, No. 5, 1943, pp. 151–159.

RICHARD D. NEVIUS, *Primary Examiner.*

WILLIAM D. MARTIN, JOSEPH B. SPENCER, *Examiners.*